INVENTOR
EARL E. HEINZELMAN
ATTORNEY

INVENTOR
EARL E. HEINZELMAN

ATTORNEY

June 23, 1959     E. E. HEINZELMAN     2,891,281
ROTARY MOLDING DEVICE
Filed March 19, 1954     5 Sheets-Sheet 3

INVENTOR
EARL E. HEINZELMAN

ATTORNEY

INVENTOR
EARL E. HEINZELMAN
ATTORNEY

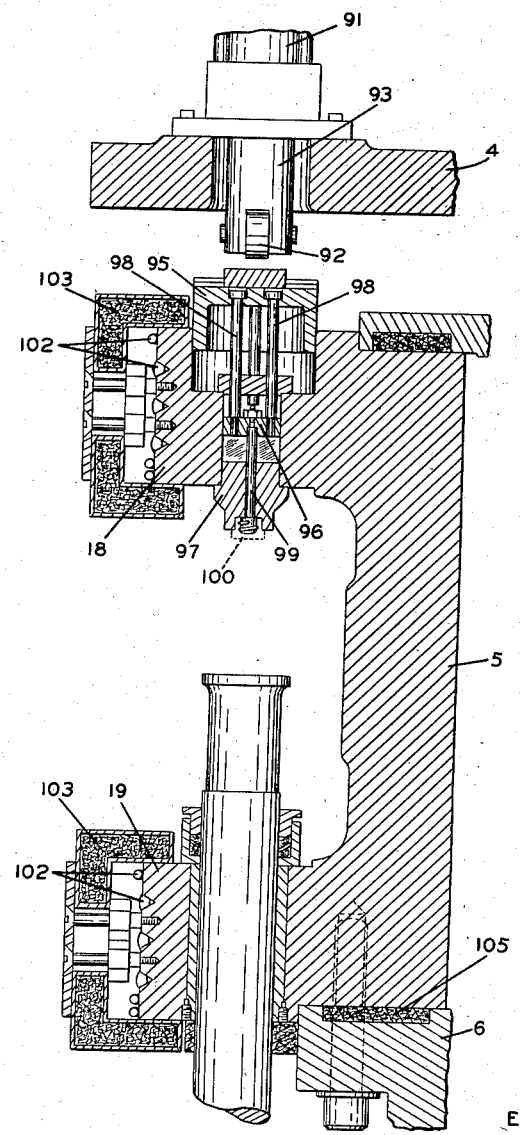

United States Patent Office 2,891,281
Patented June 23, 1959

2,891,281
ROTARY MOLDING DEVICE

Earl E. Heinzelman, Manheim Township, Lancaster County, Pa., assignor to Armstrong Cork Company, Lancaster, Pa., a corporation of Pennsylvania Application March 19, 1954, Serial No. 417,412

5 Claims. (Cl. 18—20)

This invention relates to molding apparatus, and more particularly to a rotary molding machine for the production of small articles, such as closures, buttons, tube bases, etc., from thermosetting molding compositions.

Several types of rotary molding machines have been placed in operation. One type employs mechanical means for exerting pressure on molding composition disposed in a movable mold element which is moved into molding relationship with a stationary mold element. Another type employs hydraulic pressure to perform the molding operation. In this system the flow of fluid is controlled by a single rotary valve and the fluid is commutated from this central valve to the individual lines leading to the molding stations. One of the most recent machines developed employs mechanical means for urging a movable mold cavity into molding relationship with a force plug backed up by a hydraulic cushion. In this type machine, the molding pressure is applied by the fluid in the hydraulic system.

All of the machines briefly described above possess certain disadvantages and the machine covered by this application has been developed to overcome these disadvantages and provide a device in which the molding force is applied in a direct upward thrust from a hydraulic system controlled by a plurality of valves in which the entire hydraulic system rotates with the machine, thereby doing away with the leakage resulting from the commutating rotary valve type machine. Also, in a machine of the type here under consideration, where all of the movement required to apply molding pressure is in a direct upward direction, the framework of the machine is not subjected to the torque resulting from the cam arrangement used to close the mold elements against a hydraulic cushion. Another advantage of the type of machine here under consideration is the utilization of uniform pressure which is impossible of attainment in the purely mechanical type device.

In order to build a rotary molding machine in which the entire hydraulic system, including the reservoir, pump, and motor, rotates with the device, it is necessary to build a relatively large machine to provide sufficient space to accommodate the hydraulic equipment necessary to exert molding pressure to the molding composition disposed between the mold elements. In a device employing a single hydraulic system, it is necessary to use this high molding pressure to open and close the mold elements. The present invention is directed to a double pressure hydraulic system in which a relatively low pressure is used to open and close the molds, and the high pressure necessary to exert a molding force is utilized only during the actual molding period. This double pressure system permits the building of a small compact machine capable of attaining the high molding pressure required and in which the entire hydraulic system rotates with the machine.

An object of this invention is to provide a rotary molding machine for high-speed operation in which the molding force is applied by hydraulic pressure operating through a valve mechanism in which the entire valve system rotates with the machine and there is no necessity for commutating fluid. In the preferred embodiment, a dual pressure system is utilized in which a low pressure system closes and opens the mold, and a high pressure system is brought into operation only during the actual molding period. The advantages of the double pressure system are obvious to those skilled in the art.

Another object of this invention is to provide a molding device in which a plurality of different pressure systems are used so that the relatively high pressure required for converting molding composition from molding powder to the completed article is only in use during the actual molding operation and the mold is opened and closed by fluid under a substantially lower pressure.

Another object of this invention is to provide a machine in which all movement of the molding tools, whether during opening or closing of the mold, actual molding, or permitting the molding composition to breathe after the mold has been initially closed, is controlled by the hydraulic system in such manner that it may be specifically controlled both as to time and pressure.

In order to that the machine may be more readily understood, it will be described in connection with the attached drawings, in which:

Figure 6 shows a modification of the force plug assembly in which a knock-out device is employed.

Figure 1:
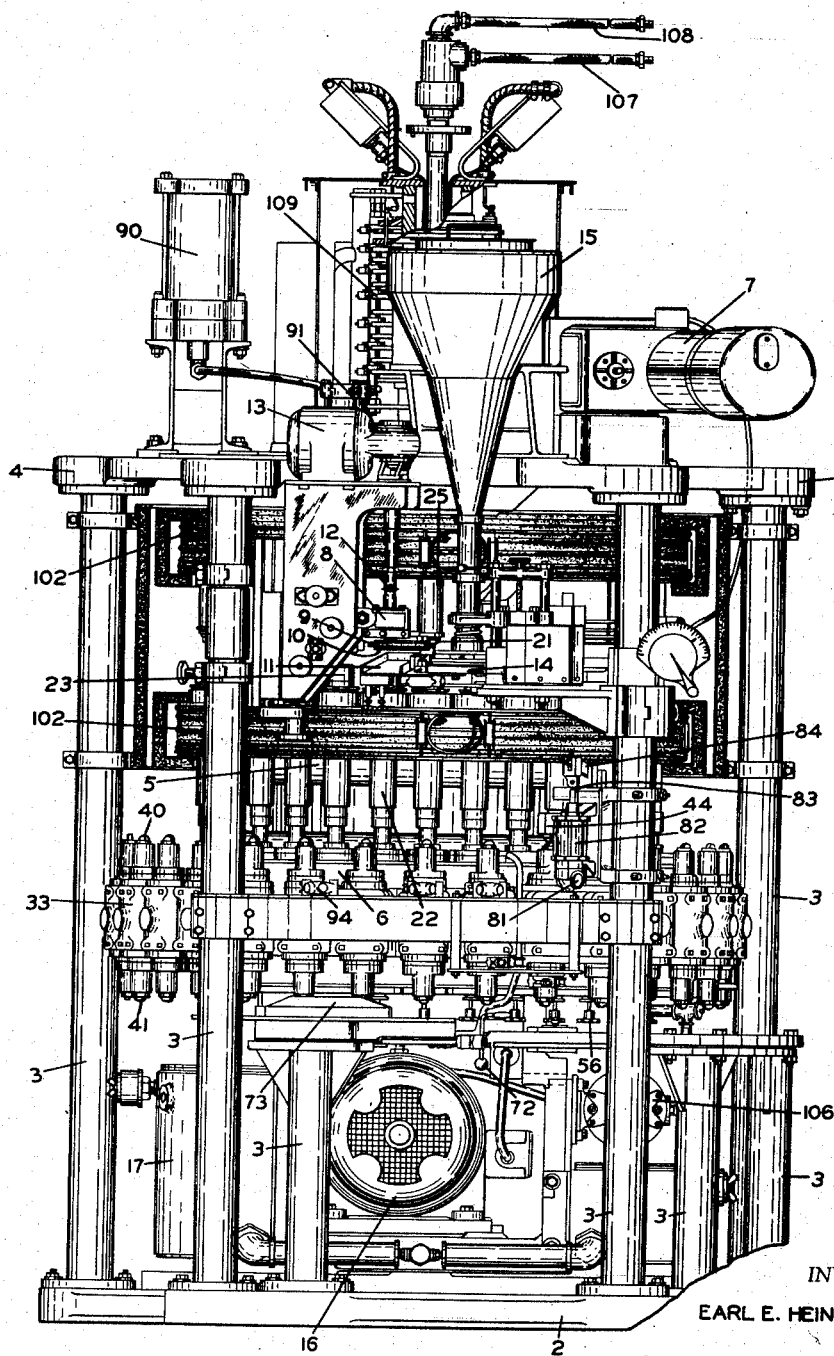
Figure 1 is an elevational view of the machine.

Referring to Figure 1, there is shown a rotary molding machine having a stationary superstructure and a rotary core mounted therein. The structure comprises a base 2 and a plurality of supporting columns 3 attached to which is a head member 4. The rotatable portion of the machine comprises primarily a die block 5 and a cylinder block 6 to which all the attendant molding equipment is attached. This die block and cylinder block assembly is mounted in a bearing in the base 2 and a bearing in the head member 4. The mechanism for removing the completed molded articles from the mold elements and the mechanism for supplying a new charge of molding composition to the mold cavity are both mounted on the upright column 3 in such manner that the mold elements pass in operating relationship thereto during the rotary cycle of the machine. The cam means or other control means for operating the valves are also mounted on the columns 3 in a suitable manner to engage the valve-actuating members as the valves move past them in their course of rotary travel. Rotary motion is imparted to the rotatable portion of the device by a motor 7 and a variable speed drive connected to a bull gear, not shown in the drawing.

During a major portion of the rotary cycle, the molds are held in closed position under molding pressure. During the balance of the cycle, the mold elements are parted, the molded piece is removed from the force plug, the mold cavity is cleaned, and a new charge of molding composition is placed in the cavity and the mold is again closed for the molding cycle. The mold is under molding pressure during about 300° of the rotary path of travel and is open during the remaining 60°. It will be understood, of course, that the molding cycle is not the same on all types of molding composition and, therefore, the controls for opening and closing the molds are adjustable so that the molding cycle can be varied within certain limits. In Figure 1 the molds visible in the front of the machine are open, because this view shows the 60° area in which the operations referred to above are performed.

The unscrewing device is shown generally at 8, which is merely a belt 9 operating around pulleys 10 in such manner that the belt is engaged by the molded article on the force plug as the force plug revolves past the belt. The direction of travel of the belt is such that its engagement with the article unscrews the article from the force plug. The unscrewed article drops into a chute 11, which conveys it to a suitable receptacle, not shown. The rotating unscrewing device 8 is operated through flexible coupling 12 by a motor 13.

The mold charging or feeding device is shown generally at 14 and the hopper 15 contains a reservoir of molding powder to be conveyed to the molds by the feeder 14. The operation of the preferred feeder is described in copending patent application Serial No. 417,364, filed March 19, 1954, now Patent No. 2,808,859.

The hydraulic pressure in the system is produced by a motor 16 which operates two pumps, one for supplying the high pressure fluid and the other the low pressure fluid. In the preferred embodiment here under consideration, the low pressure system operates at about 500 pounds and the high pressure system at about 1100 pounds. These pressures may be varied, however, and different molding compositions as well as molded articles of different size require different pressures. The low pressure system is suitable for carrying a maximum pressure of 1000 pounds per square inch, while the high pressure system is capable of carrying pressures up to 1650 pounds per square inch. The oil for operating the hydraulic system is supplied to the pumps from a reservoir 17. The entire hydraulic system comprising the motor, oil reservoir, pumps, valves, hydraulic lines, and cooling system rotates with the die block and cylinder block.

The operation of the pressure system will be described in connection with Figures 2 and 3, which show a cross-sectional view of a portion of the die block 5 and cylinder block 6 showing one molding station and the hydraulic channels attendant thereto. The die block 5 is provided with two radial flanges 18 and 19 completely surrounding it, and the cylinder block 6 is provided with a radial flange 20. Flange 18 acts as the support for the stationary mold elements or force plug 21. Flange 19 acts as a guide for the ram 22 carrying the movable mold element or cavity 23. Flange 20 carries the valve mechanism and fluid passages for moving ram 22 and exerting molding pressure on molding composition carried in the mold cavity 23 when said cavity is in molding relationship with said force plug 21. The arrangement of these various elements and the alignment thereof is clearly shown in Figure 2.

The force plug or upper mold member 21 is in fixed position mounted on the stationary plunger 24, and its position with respect to the mold cavity 23 is fixed by reason of the spacer 25 between the flange 18 and the force plug 21. The mold cavity 23 is positioned on a movable ram 22, which moves vertically through the flange 19 on the die block 5. The ram 22 carries a piston 26 on its lower extremity. This piston 26 operates reciprocally in a cylinder 27. The piston carries packing glands 28 on one side and 29 on the other side to prevent leakage of fluid past the piston regardless of which direction the piston is actuated by the fluid in the cylinder.

The cylinder block 6 is provided with three radial fluid-carrying channels 30, 31, and 32. Channel 30 carries hydraulic fluid under high pressure and channel 32 carries hydraulic fluid at low pressure. Channel 31 is in the exhaust channel for both high and low pressure systems.

Figure 2:
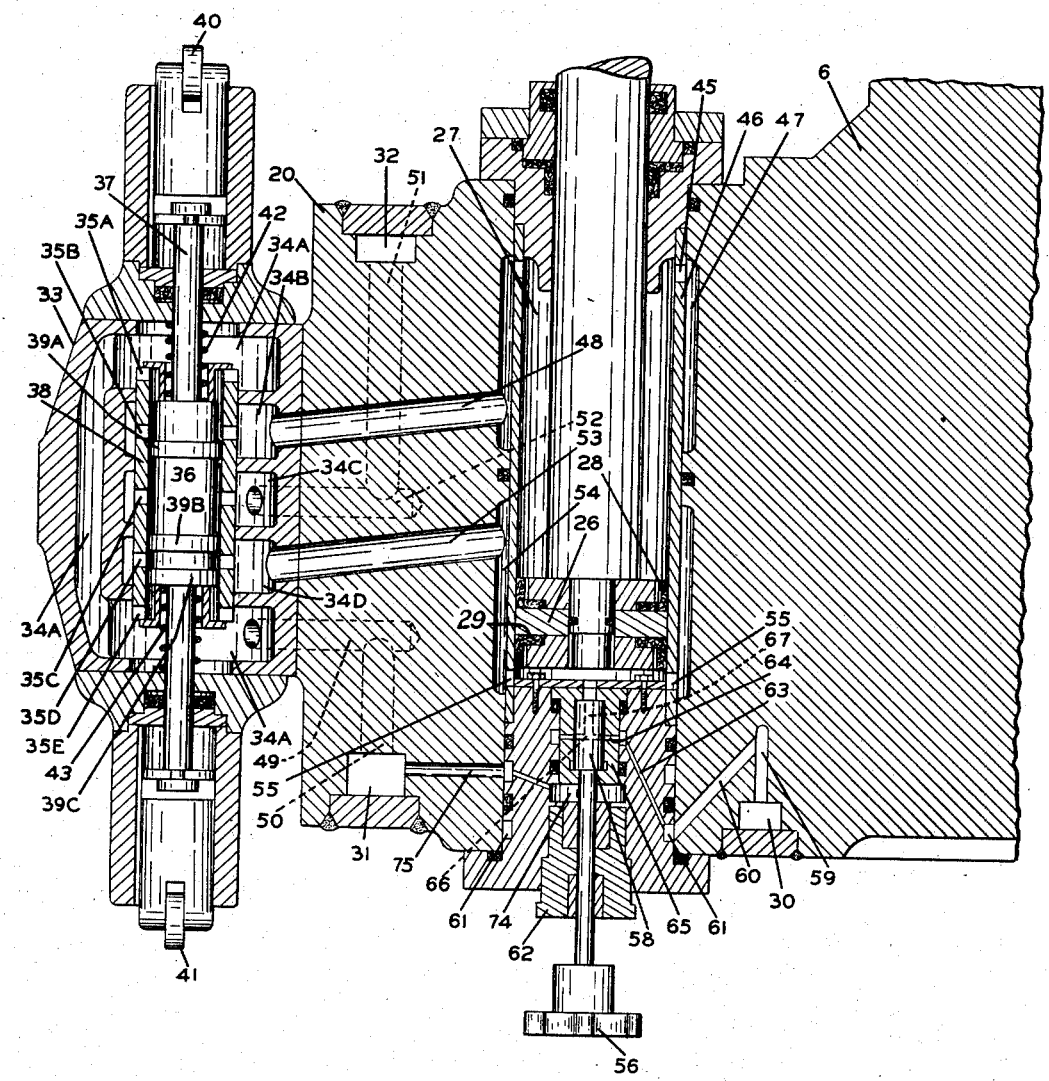
Figure 2 is an enlarged cross-sectional view of the valve arrangement at one of the molding stations.
Figure 3:
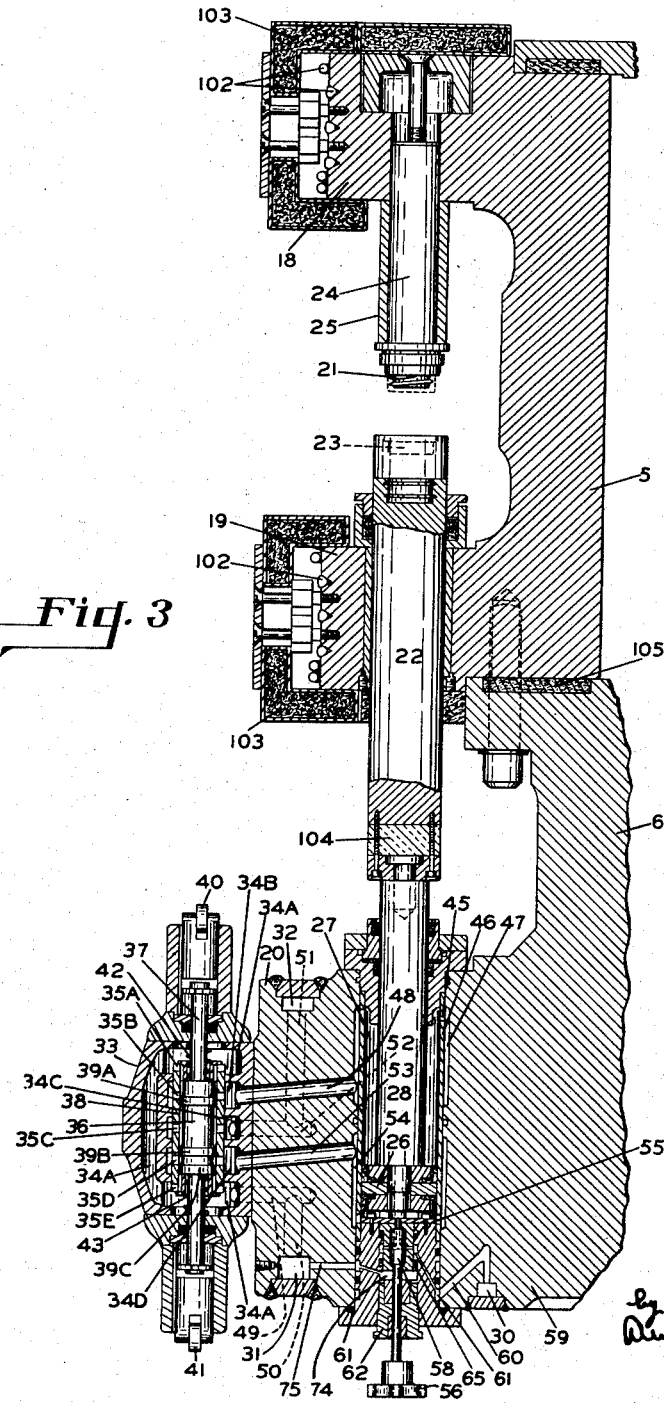
Figure 3 is a sectional view showing one molding station with a diagrammatic view of the valve system associated with each molding station for transmitting the low pressure and high pressure fluid to the plunger to close the mold and exert molding pressure thereon.

As shown in Figure 3, the mold elements 21 and 23 are separated and the piston 26 is close to the bottom of its path of travel. From this position, if the molding powder is placed in the cavity, the mold elements are brought in molding relationship to one another by means of the fluid in the low pressure system. This is accomplished by the valve 33. (Figures 2 and 3.)

There is one valve 33 provided for each molding station on the machine. These valves are arranged around the cylinder block 6 in the central area of the machine as shown in Figure 1. Each valve 33 is provided with a plurality of radial compartments 34 having ports 35 in their side walls for communication of fluid from one compartment to another. A piston 36 extends longitudinally through the valve and is adapted for reciprocatory motion with respect to said compartments 34. The piston 36 is positioned midway on a shaft 37 which extends longitudinally through the valve body. Each end of the shaft 37 is provided with cam rollers for engagement with cams attached to the stationary part of the machine. In order for the fluid to pass from one radial compartment 34 through ports 35 to another radial compartment, it must travel along the piston 36 which is of a lesser diameter than the bore 38 of the valve. The piston 36 is provided with enlarged portions 39 which fit tightly in the bore of the valve and prevent leakage of fluid from one compartment to another. With this arrangement, it is possible to seal each of the compartments from one another or allow fluid to communicate from one compartment to the other during a predetermined period of the rotary cycle of the cylinder block 6.

As shown in Figures 2 and 3, neither roller 40 at the top of the shaft 37 nor roller 41 at the bottom of the shaft 37 is in engagement with an operating cam. When this condition exists, the valve piston 36 is held in its center position by means of springs 42 and 43. In this centered condition, communication of fluid from one compartment to another is blocked.

Immediately after the charge of molding composition is placed in the cavity 23, cam roller 40 strikes cam 44 (Figure 1), pushing the piston 36 in a downward direction. Downward movement of the piston 36 moves enlarged portion 39–B from its position immediately above port 35–D to a point immediately below port 35–D, putting compartment 34–C in communication with compartment 34–D through ports 35–C and 35–D. Compartment 34–B is also in communication with compartment 34–A through ports 35–B and 35–A. With this avenue of communication between compartment 34–B and 34–A, the fluid which is entrapped in cylinder 27 from the previous mold-opening operation is allowed to escape from the cylinder through the orifice 45 in the cylinder wall 46 into chamber 47 surrounding the top part of cylinder 27, channel 48, into compartment 34–B, through port 35–B, along the piston 36, through port 35–A, to the exhaust compartment 34–A. The exhaust compartment 34–A comprises the entire outer area of the valve body from the top to the bottom, as shown in Figure 3. The lower portion of compartment 34–A is in communication with exhaust channel 31 through channels 49 and 50.

The downward movement of the valve piston 36 also moves enlarged portion 39–B from the upper side of port 35–D to the lower side of port 35–D, permitting fluid to be communicated from compartment 34–C to compartment 34–D. The fluid under low pressure carried by the channel 32 passes through channels 51 and 52 into compartment 34–C of the valve, through port 35–C, along piston 36, through port 35–D, into compartment 34–D, from which it passes through channel 53 into chamber 54 surrounding the cylinder wall 46. From the chamber 54 the fluid passes through the orifices 55 into the cylinder 27, forcing piston 26 in an upward direction to bring molding elements 21 and 23 into molding relationship. The length of the cam 44 is such that as soon as the mold is closed, roller 40 is disengaged from the cam and the springs 42 and 43 center the valve, blocking all compartments from communication with one another, entrapping the fluid in the cylinder, and holding the mold closed.

At this point in the rotary path of travel, the high pressure or molding pressure is exerted on the mold element by means of the high pressure fluid carried in the channel 30. This is accomplished by the valve wheel 56 engaging an adjustable stationary stop 57 on the machine, which is so positioned as to turn the valve wheel 56 through a 45° arc. The valve stem 58 is so drilled that every 45° turn of the wheel 56 will either open or close the valve. The fluid is transmitted from the high pressure channel 30 through channels 59 and 60 in the cylinder block 6 into the annular channel 61 surrounding the valve assembly 62. From this annular channel 61 the fluid passes through channel 63 to a horizontal channel 64 in the bushing 65 in which valve stem 58 rotates. This horizontal channel 64 is in alignment with the horizontal channel 66 in the valve stem 58. The valve stem 58 is drilled longitudinally so that the high pressure fluid entering the valve stem from the horizontal channel 64 is conducted upwardly through drilled channel 67 in the valve stem 58 into cylinder 27, forcing piston 26 upwardly under high pressure during the molding cycle. The valve wheel 56 remains in this open position during the molding cycle, which is about 300° of the circular path of travel of the cylinder block 6, after which the wheel 56 strikes another adjustable stationary stop 68, which turns it another 45°, misaligning the channel 64 in the valve stem 58 with the channel 66, thereby closing off the high pressure circuit and the fluid is entrapped in the cylinder holding the mold under pressure. This high pressure fluid is entrapped in cylinder 27 because the only means of exhausting cylinder 27 is through valve 33, which at this time is in center position with all compartments blocked.

The valve opening stop 57 is attached to a bracket 69 adapted for adjusting movement around the semi-circular track 70. Likewise, the stop 68 is attached to an adjustable bracket 71 which is capable of adjustment by means of crank 72. By adjusting the brackets 69 and 71, it is possible to control the amount of the rotary path of travel of the machine during which the high pressure valve is open.

At this point in the rotary path of travel, cam roller 41 on the bottom of valve 33 strikes a cam 73, moving the piston 36 in an upward direction. This upward movement moves enlarged portion 39–A to the upper side of port 35–B, permitting fluid to communicate from compartment 34–C to compartment 34–B through ports 35–C and 35–B. This permits the low pressure fluid carried in channel 32 to pass through channels 51 and 52, compartment 34–C, port 35–C, port 35–B, compartment 34–B, channel 48, into chamber 47 surrounding the cylinder wall 46. From chamber 47, the fluid passes through ports 45 in the cylinder wall 46, into the cylinder 27, forcing piston 26 in a downward direction. This downward movement of the piston 26 forces the fluid in the bottom of the cylinder 27 through orifices 55 into chamber 54. From this chamber 54 the fluid is forced through channel 53 into valve compartment 34–D. Since the piston 36 is up, the enlarged portion 39–C is on the upper side of port 35–D so that the fluid can communicate from compartment 34–D to exhaust compartment 34–A, from which it passes through passages 49 and 50 into exhaust channel 31.

The stop 68 for engagement with the valve wheel 56 and the cam for engagement by cam roller 41 are both mounted on the same bracket 71 so that the relationship between the time of closing the high pressure valve and the time of opening the exhaust valve will always be the same, regardless of any adjustment made in the positioning of the stop 68 to increase or decrease the molding cycle. This arrangement insures against the possibility of the setting being such that the exhaust valve will open before the high pressure valve is closed.

Immediately below the bushing 65 is a chamber 74 for the reception of any fluid leaking past the connection between the horizontal channels 64 and 66. Chamber 74 is connected by channel 75 to exhaust channel 31.

Figure 4:
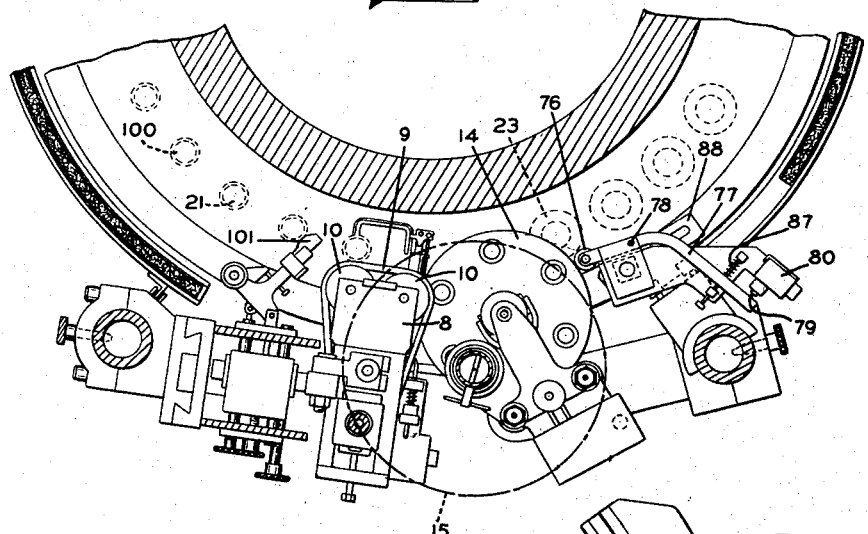
Figure 4 is a top plan view showing the relative position of the equipment for removing the finished molded pieces from the force plug and the equipment for supplying a new charge of material to the mold cavity.
Figure 5:
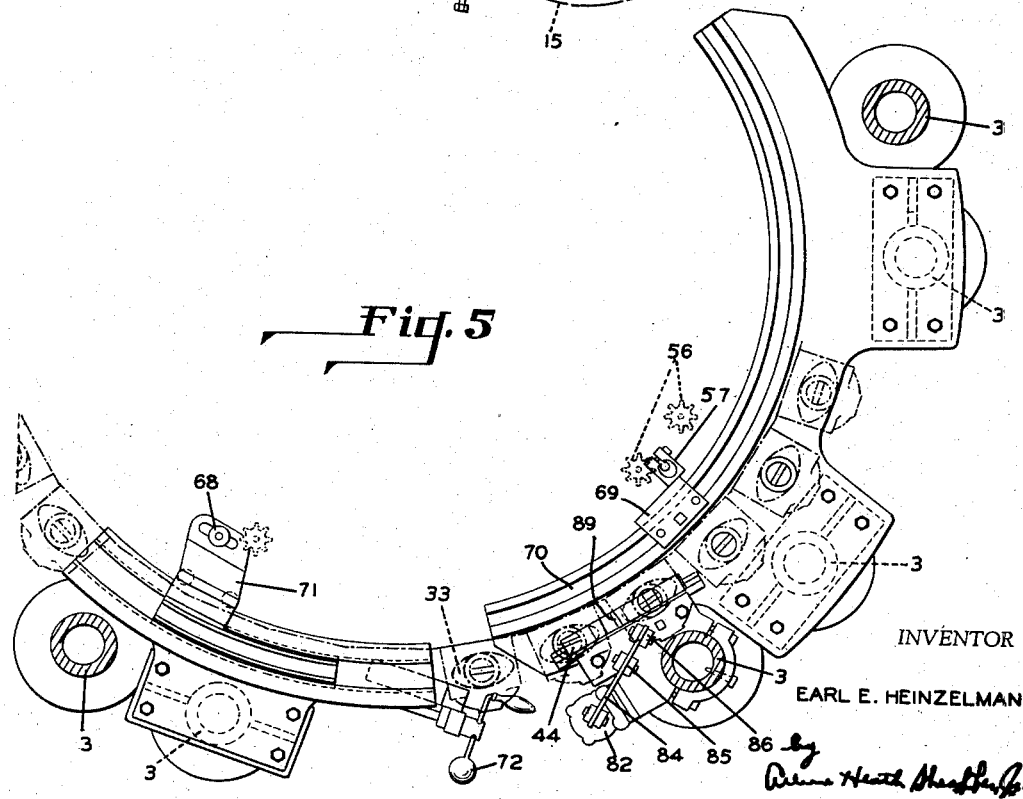
Figure 5 shows the relative position of the cams for operating the valves to control the flow of fluid to open and close the mold and exert molding pressure on the composition.

Certain molding compositions require a period of venting to permit entrapping gases, etc., to escape from the molding composition immediately after the mold has been closed and the composition is placed under initial compression, but before the high or molding pressure is exerted on the molding composition. This venting period is not the same for all molding composition, nor it is the same for all sizes of molded articles. In order to provide a means of permitting venting for the proper period of time for the specific molding composition being used, there is provided a means for lifting cam 44 away from its engagement with roller 40 immediately after the mold elements 21 and 23 have been brought into initial engagement. This is accomplished by the mechanism illustrated in Figures 4 and 5. The mold cavity 23 as it moves upwardly engages the barrel-shaped roller 76 attached to the end of an arm 77. Arm 77 pivots about pivot point 78. The other end of the arm 77 has a contact point 79 in alignment with a micro switch 80. When micro switch 80 is closed, it energizes a solenoid valve 81 on the air cylinder 82. The piston of the air cylinder 82 is connected to a plunger 83. The operation of the air cylinder is such that when air is admitted thereto it forces the piston downwardly, which in turn exerts a downward movement on the end of rocker arm 84, pivoting said rocker arm about point 85, which raises the other end 86, carrying with it the cam 44. This raises cam 44 out of engagement with cam roller 40, permitting the valve piston 36 to center itself, cutting off the supply of low pressure fluid and holding the mold members 21 and 23 in stationary position by means of the entrapped fluid in the cylinder 27. The solenid 81 remains energized only during the time that the barrel-shaped roller 76 is in engagement with the cavity 23. As soon as the cavity has passed the roller 76, the contact of the micro switch 80 is broken by means of spring 87 operating on the end of arm 77, swinging it about pivot point 78. However, the piston in the air cylinder will remain in the downward position, holding cam 44 in its raised position until a second micro switch is engaged by the moving molding station. This second micro switch moves solenoid valve 81 in the other direction, admitting air to the bottom of the cylinder 82, raising the piston and dropping the cam 44 to its normal operating position.

By the time cam 44 returns to its normal operating position, the molding station on which the venting action has taken place has moved sufficiently far that the cam 44 will not engage the cam roller 40. Therefore, the mold in question remains in this initially closed state until the valve wheel 56 for the molding station in question engages stop 57, opening the high pressure line to the piston 26 and exerting molding pressure on the mold elements. This venting assembly is mounted on an adjustable bracket 88 so that it can be moved around the path of travel of the mold elements in order that the roller 76 will be engaged at the proper time in the upward path of travel of the mold cavity 23 to permit the breathing cycle to occur when most desirable for the particular molding composition in use and the size of the molded piece being produced.

Due to the fact that machines of the type here under consideration do not always operate at the same speed, it is essential that the length of cam 44 be variable so as to insure sufficient time for the valve 33 to close the mold sufficiently before the cam 44 is raised and venting accomplished. This is done by forming cam 44 in segments 89 so that the cam can be shortened or lengthened, depending on the speed of operation of the machine.

In the molding of certain pieces, the force plug assembly is such that when the mold opens there is insufficient area of the molded article exposed for proper engagement by the unscrewing device. In order to remove the article from the force plug in this type assembly, it has been found desirable to employ the knock-out arrangement illustrated in Figure 6. The present machine is particularly well adapted for this knock-out operation, inasmuch as the mounting of the upper mold element is such that the knock-out can be performed by a direct downward thrust on the center line of the molded piece without any interference with the mechanical or hydraulic equipment utilized in performing the actual molding operation. When the knock-out operation is performed, a force plug assembly of the type shown in Figure 6 is used in place of the conventional force plug as illustrated in Figure 2. In operating this knock-out device, the conventional force plug 21 and spacer 25 are removed from the assembly and the special type force plug shown in Figure 6 is inserted in the same position in the radial flange 18 of the die block 5. The hydropneumatic booster shown generally at 90 (Figure 1) actuates a piston in hydraulic cylinder 91, which in turn exerts a downward force on a roller 92 connected to the end of piston rod 93. This piston and roller mechanism is mounted on the immovable head 4 of the machine; however, the roller is adapted for vertical reciprocatory movement. At the proper time in the circular path of travel of the mold elements carried by the die block 5, a pilot air valve 94 is engaged by a cam surface on the valve body 33. This pilot air valve 94 admits air to the hydropneumatic booster 90, which actuates the piston in cylinder 91, forcing roller 92 downward into engagement with the reciprocatory member 95, which is part of the force plug assembly 96. The force plug assembly 96 is comprised of two parts, a movable part and a fixed part. The fixed part, designated by the numeral 97, is securely attached to the flange 18 of the die block 5. The movable portion 95 moves reciprocally with respect to portion 97 and is kept in proper alignment by means of guide pins 98 moving in holes in the fixed portion 97. The threaded portion of the mold is on the end of the pin 99 which moves with respect to the fixed portion 97. When the movable portion 95 moves downwardly, it forces the molded piece 100 down into exposed position where it can be engaged by the unscrewing belt 9. After the mold has been recharged and the molding elements are again brought into molding relationship with one another, the mold cavity engages protruding pins which extend down from the movable portion 95 of the force plug assembly 96 and force the movable portion 95 to its uppermost position, where it is ready for the knock-out operation after the curing cycle has been completed on the mold.

In order to break the initial bond between the force plug and the molded article immediately after the mold elements have separated and before the molded article reaches the unscrewing device, there is provided a spring-urged finger 101 which intercepts the path of travel of the molded article carried by the force plug. As the molded article 100 pushes the finger 101 out of its path of travel, the resistance offered by the springs exerts a rotary motion to the molded article, thus breaking the bond between the article and the force plug.

The heat necessary to cure the molding composition during the limited time allowed for the high-speed cycle of operations is imparted to the molding composition through the die block 5 and through the plungers 22 and 24 to which the mold elements 21 and 23 are attached. The die block is heated by means of tubular heater units 102 which surround the die block on the flanges 18 and 19. Insulating elements 103 are provided to prevent the heat being radiated outwardly but instead the heat is directed into the die block through the mold elements to the powder. In order to prevent the heat from being conducted down through the die block 5 and ram 22 to the cylinder 27 a layer of insulating material 104 is provided where the ram 22 connects onto the plunger operated by the piston 26. The die block 5 is insulated from the cylinder block by means of a layer of insulating material 105. However, due to the constant operation of the machine at high speeds, the hydraulic fluid becomes heated by means of being forced through the restrictions and also by the heat which is transmitted to it through the cylinder block 5. The hydraulic fluid should be maintained at a temperature not in excess of 130° F. In order to do this, it has been found necessary to conduct cooling fluid into the center of the machine to reduce the temperature of the oil. This is done by a conventional cooling system, designated by the numeral 106 (Figure 1). The cooling fluid is conducted into the device through conductor 107 and is discharged through the conductor 108. The electricity for operating the heating elements 102 and the motor 16 carried by the rotating cylinder block 6 is commutated to the device through the slip ring assembly illustrated generally at 109.

I claim:

1. In a molding machine, a supporting base; a carrier mounted for rotation with respect to said base; a pair of cooperating mold elements mounted on the carrier for rotation therewith in a closed path; a dual pressure hydraulic system mounted on said carrier for rotation therewith, one of said mold elements being movable with respect to the other mold element, the movement of said movable mold element being controlled by a piston actuated by said hydraulic system; means for developing dual pressure in said hydraulic system; means for conducting fluid at a low pressure to said piston to move the one mold element into molding relationship with the complementary mold element and for moving the movable mold element out of molding relationship after the molding operation has been completed; and means for conducting fluid at high pressure to the piston while the mold elements are in molding relationship.

2. In a molding machine, a supporting base; a carrier mounted for rotation with respect to said base; a plurality of pairs of cooperating mold elements arranged around the periphery of said carrier for rotation therewith in a closed path; a dual pressure hydraulic system mounted on said carrier for rotation therewith, one mold element of each pair being movable with respect to the other mold element of the pair, the movement of said movable mold element being controlled by a piston actuated by said hydraulic system; means for developing pressure in said hydraulic system; means for conducting fluid at a low pressure to said piston for each pair of molding elements to move the one element into molding relationship with the complementary mold element and for moving the movable mold element out of molding relationship after the molding operation has been completed; and means for conducting fluid at high pressure to the piston while the mold elements are in molding relationship.

3. In a molding machine, a supporting base; a carrier mounted for rotation with respect to said base; a pair of cooperating mold elements mounted on the carrier for rotation therewith in a closed path; a dual pressure hydraulic system mounted on said carrier for rotation therewith, one of said mold elements being movable with respect to the other mold element, the movement of said movable mold element being controlled by a piston actuated by said hydraulic system; means for developing pressure in said hydraulic system; a valve positioned on the line between the means for developing pressure and said piston to control the flow of low pressure fluid to said piston to move the mold elements into molding relationship with one another; means for closing said valve after the molding elements are brought into molding relationship; a valve on the high pressure line between the means for developing molding pressure and said piston; means for opening said high pressure valve after said low pressure valve has been closed; and means for closing said high pressure valve at the completion of the molding cycle before said low pressure valve is opened for separating the mold elements.

4. In a molding machine, a supporting base; a carrier mounted for rotation with respect to said base; a pair of cooperating mold elements mounted on the carrier for rotation therewith in a closed path; a dual pressure hydraulic system mounted on said carrier for rotation therewith, one of said mold elements being movable with respect to the other mold element, the movement of said movable mold element being controlled by a piston actuated by said hydraulic system; means for developing pressure in said hydraulic system; means for conducting fluid from said pressure-developing means to said piston; a high pressure control valve and a low pressure control valve positioned between said means for developing pressure and said piston; control means positioned on the stationary framework of said machine to actuate said valves in such manner that the low pressure system will be utilized to bring the molding elements into molding relationship with one another and to separate the molding elements after the molding operation has ben completed; and means to open the high pressure valve to exert molding pressure on the mold elements after they have been brought into molding relationship with one another, said control means being so arranged that the high pressure valve does not open until the low pressure valve closes at the start of the molding cycle and the low pressure valve does not open to separate the mold elements until the high pressure valve closes at the completion of the molding cycle.

5. In a molding machine, a supporting base; a carrier mounted for rotation with respect to said base; a pair of cooperating mold elements mounted on the carrier for rotation therewith in a closed path; a dual pressure hydraulic system mounted on said carrier for rotation therewith, one of said mold elements being movable with respect to the other mold element, the movement of said movable mold element being controlled by a piston actuated by said hydraulic system; means for developing pressure in said hydraulic system; a low pressure line leading from said pressure-developing means to said piston and a high pressure line leading from said pressure-developing means to said piston; a valve on said low pressure line to control the flow of low pressure fluid to said piston to bring the mold elements into molding relationship with one another; a valve on said high pressure line to control the flow of high pressure fluid to exert molding pressure on the molding composition disposed between said mold elements; and means for closing said low pressure valve a predetermined period of time before said high pressure valve is opened to permit venting of gases from the molding composition positioned between the mold elements and thereafter opening the valve on the high pressure system to exert molding force on the molding composition.

References Cited in the file of this patent
UNITED STATES PATENTS

| | | |
|---|---|---|
| 1,991,706 | Seabury | Feb. 19, 1935 |
| 2,155,316 | Lauterbach | Apr. 18, 1939 |
| 2,728,946 | Pinsenschaum | Jan. 3, 1956 |